US007690421B2

(12) United States Patent
Burns et al.

(10) Patent No.: US 7,690,421 B2
(45) Date of Patent: Apr. 6, 2010

(54) LOW HUMIDITY DETECTION SYSTEM AND METHOD THEREOF

(75) Inventors: Trevor Burns, Milford Center, OH (US); Junichi Kanemaru, Upper Arlington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 409 days.

(21) Appl. No.: 11/836,923

(22) Filed: Aug. 10, 2007

(65) Prior Publication Data

US 2009/0039170 A1 Feb. 12, 2009

(51) Int. Cl.
*F24F 11/00* (2006.01)

(52) U.S. Cl. .................... 165/237; 165/223; 236/44 A; 236/44 C; 236/91 C; 62/244; 62/176.1; 62/176.6

(58) Field of Classification Search ................ 165/237, 165/223, 230; 236/44 A, 44 C
See application file for complete search history.

(56) References Cited

U.S. PATENT DOCUMENTS 5,097,672 A 3/1992 Takenaka et al.
6,625,995 B2 * 9/2003 Remond et al. ............... 62/133
2006/0000597 A1 1/2006 Errington et al.
2006/0004494 A1 1/2006 Errington

FOREIGN PATENT DOCUMENTS

| | | |
|---|---|---|
| JP | 61-295115 | 12/1986 |
| JP | 4-201618 | 7/1992 |
| JP | 2001-341514 | 12/2001 |
| JP | 2002-137630 | 5/2002 |

* cited by examiner

*Primary Examiner*—Sam Chuan C Yao
*Assistant Examiner*—Jonathan Bradford
(74) *Attorney, Agent, or Firm*—Mark E. Duell; Rankin, Hill & Clark LLP

(57) ABSTRACT

A system and method for detecting low levels of humidity (i.e. less than 10%) inside an automotive vehicle is provided whereby the total absolute humidity inside the vehicle is determined by multiplying the number of occupants in the vehicle by an absolute humidity factor to obtain a total absolute humidity expelled by the vehicle occupants. The absolute humidity outside the vehicle is added to the total absolute humidity expelled by the vehicle occupants to arrive at a total vehicle cabin absolute humidity.

7 Claims, 5 Drawing Sheets

LOW HUMIDITY DETECTION SYSTEM AND METHOD THEREOF

BACKGROUND OF THE INVENTION

1. Field of the Invention

The present invention relates to a vehicle environmental control systems and methods. More particularly, the present invention relates to systems and methods for automatically sensing fogging conditions when the relative humidity is less than 10%.

2. Description of Related Art

In conventional automobile control systems, application of remedial measures to combat fogging of the vehicle windows is manually instituted by the vehicle passengers. Naturally, such remedial measures, which primarily consist of activating a vehicle heating, ventilation, and air conditioning (HVAC) system into a defrost mode of operation, are employed after a fogging condition has developed, and typically require some time to alleviate the fogging condition. As will be appreciated, such systems are not suitable for automatic control, and do not anticipate impending fogging conditions.

In vehicles incorporating an automatic HVAC control system, it has been proposed to sense internal and external conditions to determine whether fogging is likely. Such known systems include a glass temperature sensor and a humidity sensor. The glass temperature sensor is affixed to an internal surface of the windshield glass, and the humidity sensor is disposed adjacent to the windshield glass. The system uses the sensed glass temperature and the sensed cabin humidity to determine whether a possible fogging condition exists, and actuates the HVAC system in response thereto. Unfortunately, such automated systems require additional sensors, which are expensive to purchase and require significant amounts of labor to install and electrically connect to the HVAC controller.

Thus, in order to overcome the above mentioned disadvantage it has been proposed to use existing sensors to calculate the temperature of the glass, which reduces the number of sensors required thereby ultimately reducing the cost of the vehicle. This method is disclosed in U.S. application Ser. Nos. 10/881,347 and 10/881,406, which are both assigned to the assignee of the present invention and are both herein incorporated by reference. The glass temperature in U.S. application Ser. Nos. 10/881,347 and 10/881,406 are calculated from data obtained from existing sensors that measure the speed of the vehicle and the ambient temperature. The method disclosed in U.S. application Ser. Nos. 10/881,347 and 10/881,406 also use a humidity sensor to determine the relative humidity inside the vehicle. These humidity sensors, however, have difficulty measuring or sensing low humidity levels, such as when the relative humidity is less than 10%. Thus, the method disclosed in U.S. application Ser. Nos. 10/881,347 and 10/881,406 limits the intensity of the HVAC response in low humidity conditions.

Therefore, there is a need in the art for a system and method that can accurately determine the humidity when the relative humidity is less than 10% and thereby anticipate fogging conditions under low humidity conditions.

SUMMARY OF THE INVENTION

In accordance with one aspect, the present invention overcomes the above mentioned disadvantages by providing a method for detecting an absolute humidity inside an automotive vehicle comprising the steps of providing an automotive vehicle defining a cabin, the vehicle including an HVAC system, an integrated sensor assembly, and an ambient temperature sensor, calculating the number of occupants in the vehicle, multiplying the number of occupants by an absolute humidity factor to obtain a total occupant expelled absolute humidity, determining an outside absolute humidity, and adding the outside absolute humidity to the total occupant expelled absolute humidity to obtain a total vehicle cabin absolute humidity.

In accordance with another aspect, the present invention provides a method for detecting low levels of humidity inside an automotive vehicle comprising the steps of providing an automotive vehicle defining a cabin, the vehicle including an HVAC system, an integrated sensor assembly, and an ambient temperature sensor, measuring a relative humidity in the vehicle cabin with the integrated sensor, determining if the relative humidity is less than a predetermined value, calculating the number of occupants in the vehicle, multiplying the number of occupants by an absolute humidity factor to obtain a total occupant expelled absolute humidity, determining an outside absolute humidity, and adding the outside absolute humidity to the total occupant expelled absolute humidity to obtain a total vehicle cabin absolute humidity.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
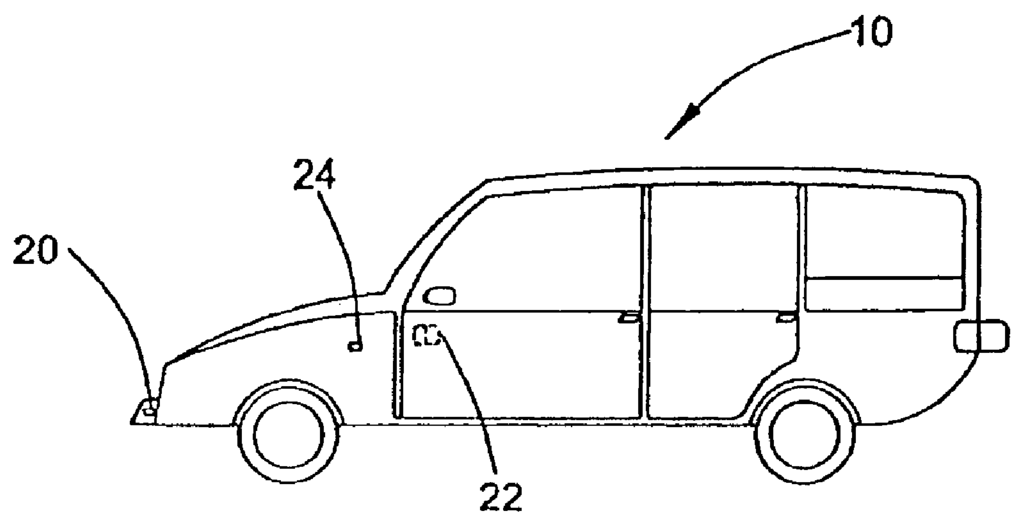
FIG. 1 is a typical vehicle incorporating the system and method of the present invention.
Figure 2:
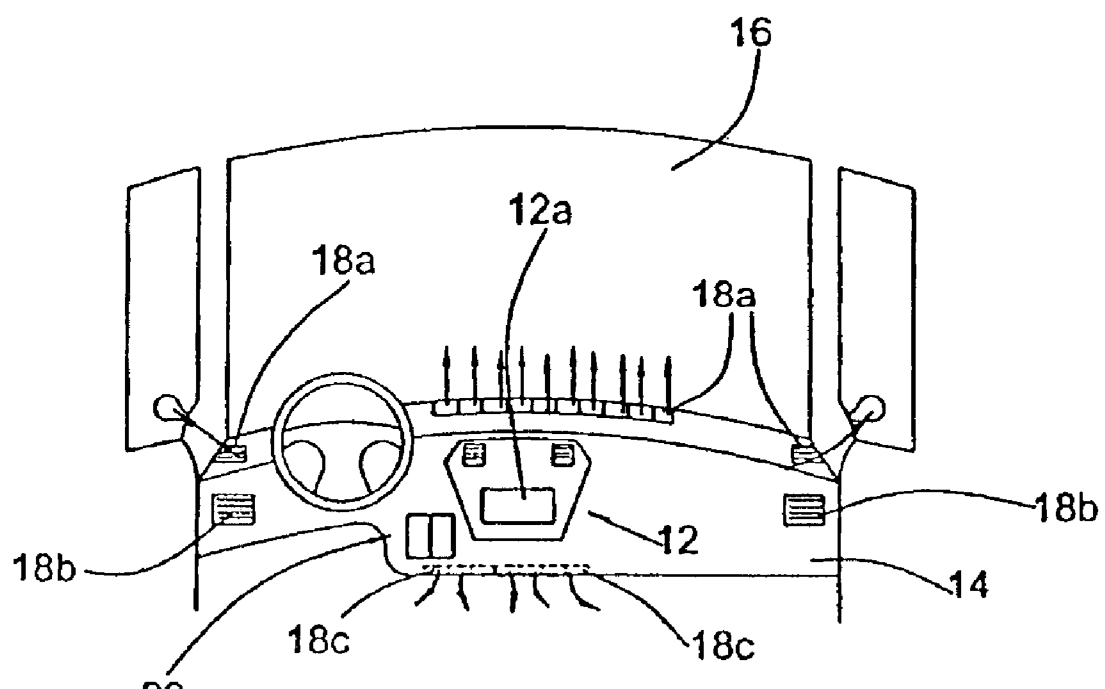
FIG. 2 is a top view of a vehicle interior incorporating the present invention.

Referring now to the drawings, FIGS. 1 and 2 show a vehicle 10 incorporating the automatic defogging system with a low humidity detection system of the present invention. As will be appreciated, the automatic defogging system is incorporated into the vehicle's computer based heating, ventilation, and air conditioning (HVAC) system, which preferably includes several modes of operation. The automatic defogging system, as part of the HVAC system described further below, is intended to be operational when the HVAC system is in an automatic mode of operation and is to operate seamlessly as one step or sequence of steps.

In the automatic mode, the user sets a desired cabin temperature and the computer or controller of the HVAC system makes necessary calculations, in response to signals from various sensors and one or more predefined programs defining operational characteristics of the HVAC system, tuned to the inherent physical characteristics of the vehicle. During the automatic HVAC control mode, the activation of the air conditioning (A/C), vent control or activation and fan speed modulation is automatically controlled in accordance with a computer algorithm that is stored in the HVAC computer of controller.

The present invention introduces one or more additional algorithms, described further below, that are used in conjunction with the HVAC system's existing algorithms in the automatic mode of operation. The one or more additional algorithms are designed to automatically calculate condensation or fogging conditions, and to appropriately activate the HVAC system (A/C power, vent control, fan speed) in response thereto. Further, as will be apparent from the following discussion, in accordance with the present invention the intensity of the HVAC system response are scaled in response to the level of the condensation or fog threat. Insofar as the basic operational characteristics of HVAC systems is generally well known in the art, such basic operational characteristics and methods will only be described hereinafter as they relate to the automatic fogging condition sensing system and method of the present invention.

Still referring to FIGS. 1 and 2, the vehicle 10 has a body defining a passenger compartment or cabin, an HVAC control and display panel 12 disposed in the dashboard 14 at a front of the passenger compartment, and a series of windows including a windshield 16. The HVAC control and display panel 12 may be a series of individual pushbuttons or, preferably, may be provided as a touch screen 12*a* wherein the user may control operation of the HVAC system via one or more on-screen menus. For example, the user may select the mode of operation (full auto/semi-auto/manual); air conditioning (A/C) operation; fresh air/recirculation; as well as select air flow or vent output (i.e. via defrost vents 18*a*, dashboard vents 18*b*, floor vents 18*c*, or one or more combinations when in the manual or semi-auto mode of operation) in addition to a desired cabin temperature set point. When in a full-auto mode of operation, the user generally inputs the desired cabin temperature set point and the HVAC system responds to sensed conditions in accordance with a predetermined computer algorithm to appropriately activate the HVAC system. Naturally, the touch screen 12*a* may provide various other functions, such as a navigation screen and entertainment center, as is well known in the art.

As will be appreciated by those skilled in the art, during operation of the vehicle 10 when the air is passing over the windshield glass 16, the windshield glass 16 is typically at a different temperature than the remaining windows, and may also be at a different temperature than the ambient air, especially when the vehicle is driven at high speeds. Thus, it is conventional in vehicles to constantly bleed air to the defrost vents and, therefore, the windshield glass 16 may be considered to be less susceptible to development of fogging conditions than would otherwise be the case.

The vehicle 10 further includes an ambient temperature sensor 20, which may be disposed at a relatively forward position on the vehicle 10, and may be disposed within the front bumper area, if desired. Naturally, it is known in the art that various locations for the ambient temperature sensor may be selected, and therefore the present invention is not limited to the currently preferred ambient temperature sensor position illustrated herein. It is noted that ambient temperature sensors are now commonly provided on vehicles, and are used, for example, to permit the operator to display the ambient temperature on a screen or display panel, such as the HVAC control and display panel 12.

The vehicle 10 also includes an integrated cabin temperature and humidity sensor module or assembly 22 preferably disposed in the vehicle dashboard adjacent the HVAC control and display panel 12, as illustrated in FIG. 2. Locating the integrated sensor assembly 22 at this relatively shielded location on the dashboard 14 prevents random environmental influences, such as solar load, from impacting the operation of the sensors. Further, locating the integrated sensor assembly 22 in the dashboard makes it relatively easy to install and electrically connect to the HVAC control system via a conventional wiring harness, without the need to introduce additional steps to the assembly process.

An integrated cabin temperature and humidity sensor assembly 22 is preferred over separate sensors for various reasons. First, the integrated sensor assembly is available at significantly reduced costs as compared to individual or separate sensors. Second, using a single integrated sensor assembly to sense both temperature and humidity inside the cabin are derived from a single location thereby leading to repeatable and consistent results for any given vehicle model. Nevertheless, it is considered apparent that, with regard to some aspects of the invention, use of the preferred integrated sensor assembly is not mandatory, but rather separate sensors, disposed adjacent to one another, could be used with equal functionality, albeit more expensive to manufacture and assemble. Further, although it is preferred that the temperature and humidity sensors be disposed in the front dashboard, this location is not necessarily mandatory. Rather, the sensors could be moved to any number of locations within the vehicle. Relatively forward locations within the cabin may be considered more desirable since preventing or alleviating windshield fogging is one aspect of the present invention.

It is preferable, however, to sense temperature and humidity at the same location within the vehicle cabin in order to determine the dew point inside the vehicle. But because the dew point is rather constant within the vehicle cabin, as long as the temperature and humidity sensors are properly calibrated they can be disposed at any location within the vehicle cabin. For example, the sensors may be disposed in the rear of the cabin or on the center console between the front seats.

Dew point is the temperature at which water in the air will condense. Humidity is the amount of water vapor in the air and is sometimes referred to as absolute humidity. Absolute humidity is the amount of water vapor present in a unit volume of air, usually expressed in kilograms per cubic meter. Relative humidity, expressed as a percentage, is the ratio of the amount of water in the air at a given temperature or the absolute humidity to the maximum amount of water that could be in the air at the given temperature. Relative humidity can be adjusted to compensate for the temperature-dependent ability of air to hold water. The dew point is related to humidity, such that as the humidity increases the dew point also increases. Thus, there is a strict and well known relationship between ambient temperature, humidity (absolute and relative), and dew point. Therefore, given either the absolute or relative humidity and the ambient temperature the dew point may be easily derived. The present invention takes advantage of this relationship and calculates the dew point based upon the cabin temperature and either the absolute or the relative humidity in the vehicle cabin.

It should be noted that relative humidity sensors have difficulty accurately measuring low humidity levels (i.e., less than 10%). Thus, depending on the relative humidity inside the cabin, the present invention will use either the absolute humidity or the relative humidity to determine the dew point. More specifically, if the relative humidity level inside the cabin is low, (i.e. less than 10%) then the present invention does not use the integrated sensor assembly 22 to measure the relative humidity. Rather, the present invention calculates the absolute humidity inside the cabin and uses the absolute humidity to determine the dew point, as will be explained below. If, on the other hand, the relative humidity inside the cabin is greater than or equal to 10% then the present invention uses the integrated sensor assembly 22 to measure the relative humidity inside the cabin. Thus, relative humidity is used to determine the dew point when the relative humidity is greater than or equal to 10%.

Figure 3:
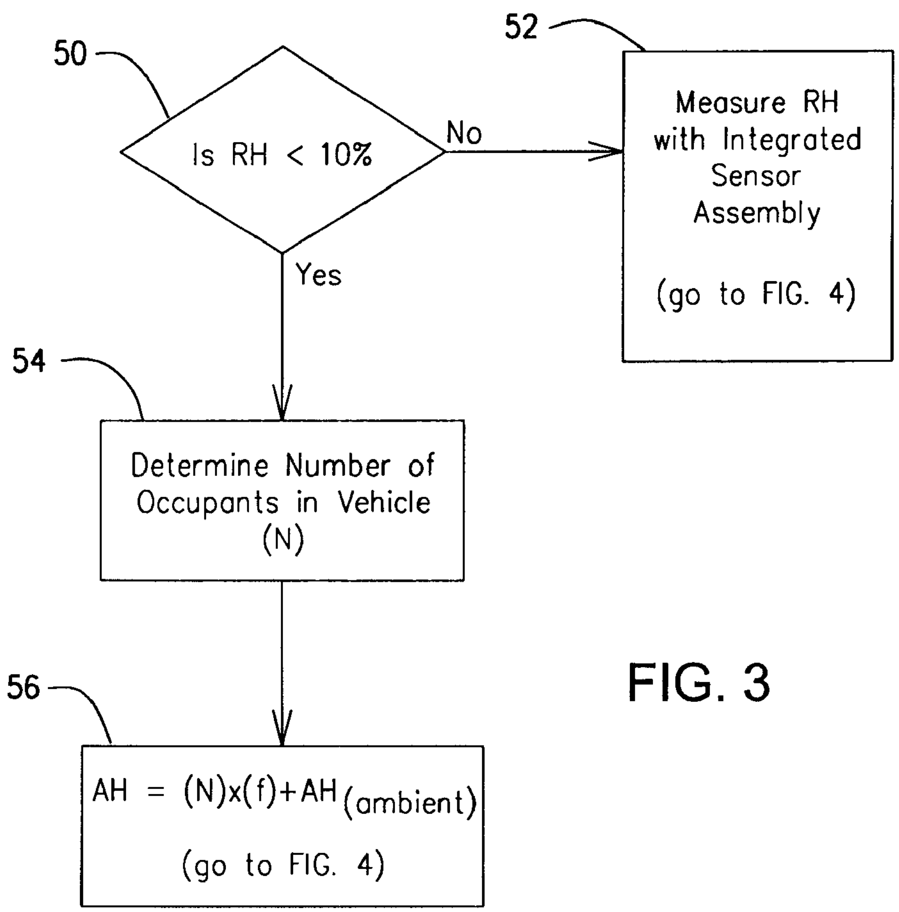
FIG. 3 is a flowchart illustrating a method of determining an absolute humidity inside the vehicle.

The flow chart in FIG. 3 illustrates how the present invention determines either the absolute humidity or the relative humidity. As mentioned above, when the relative humidity inside the cabin is less than 10% the present invention will calculate the absolute humidity to determine the dew point. Thus, in step 50 the present invention determines if the relative humidity (RH) is less than 10%. If the determination is no then the method proceeds to step 52 and the integrated sensor assembly 22 measures the relative humidity (RH) and proceeds according to FIG. 4, as will be explained below. If the determination at step 50 is yes then at step 54 the method determines the number of occupants (N) in the vehicle. This is done by means commonly known in the art, such as with infrared technology, seat weight sensors, etc. and will not be described herein. After the number of occupants (N) are determined the method proceeds to step 56 where the total absolute humidity (AH) inside the cabin is calculated using the following equation:

$$AH=(N)\times AH_{(factor)}+AH_{(ambient)} \quad (1)$$

where $AH_{(factor)}$ is the average amount of absolute humidity that a person expels and $AH_{(ambient)}$ is the absolute humidity of the air outside the vehicle. $AH_{(factor)}$ is an experimentally derived factor whereby the inventors of the present invention conducted experiments measuring the absolute humidity of many individuals. The total measured absolute humidity was divided by the total number of individuals to arrive at an average factor of absolute humidity expelled by an average person. Thus, multiplying the number of occupants (N) by the $AH_{(factor)}$ results in the total amount of absolute humidity expelled by the occupants inside the vehicle. $AH_{(ambient)}$ is determined by measuring the ambient temperature outside the vehicle with the existing ambient temperature sensor 20 and determining the corresponding absolute humidity from a look up table preferably stored in the HVAC controller or computer. Thus, the ambient temperature is input into the HVAC controller or computer via the ambient temperature sensor 20 and a corresponding absolute humidity is determined and added to the total absolute humidity expelled by the occupants described above. With this method the total absolute humidity inside the vehicle can be accurately determined when the humidity inside the vehicle is less than 10%. Once the total absolute humidity (AH) is determined the method proceeds to FIG. 4 where the dew point is determined as will be subsequently described.

Figure 4:
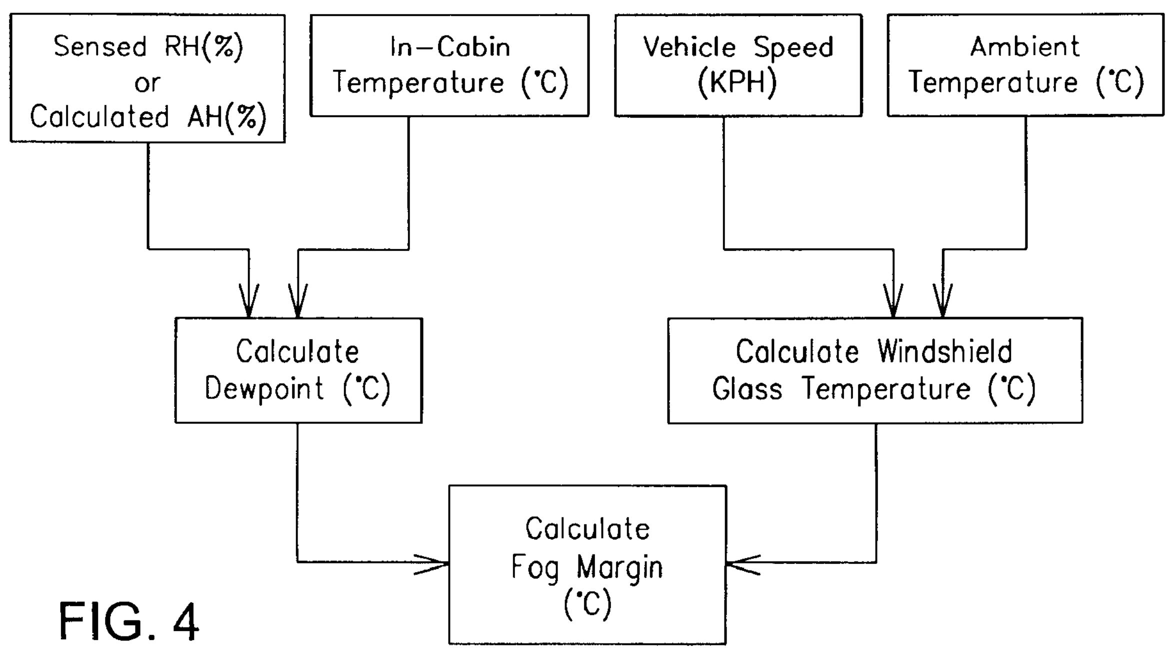
FIG. 4 is a flowchart illustrating a method of determining a fog margin.

Referring to FIG. 4, once either the absolute or relative humidity is determined the dew point is then determined. The dew point is determined by utilizing a look up table stored the HVAC controller or computer. In other words, when the cabin temperature, as measured by the integrated sensor assembly 22, and either the absolute or relative humidity are input into the HVAC controller or computer the corresponding dew point is output and used for further calculations, as will be described further below.

Still referring to FIG. 4, it is understood and well known that water vapor in the air will condense on a surface that is at or below the dew point. Thus, it is necessary to determine the windshield glass temperature in order to determine whether condensation (fog) will form on the windshield glass 16. As noted above, it is possible to directly measure the windshield glass temperature. Direct measurement, however, requires additional sensors, which are expensive and difficult to install and replace, and require modifications to existing structures (i.e., dashboard assemblies) as well as existing assembly processes. Therefore separate windshield glass temperature sensors are not preferred. Instead, through experimentation, the present inventors found that, for any given vehicle, when the cabin temperature is above a predetermined temperature (indicative of the vehicle being warm), the windshield glass temperature is a function of both the ambient temperature outside the vehicle and the vehicle speed. When the cabin temperature is below the predetermined temperature (indicative of the vehicle being cold), the windshield glass temperature is essentially equal to the ambient temperature. The present invention takes advantage of this fact, and calculates or estimates the windshield glass temperature in response to the sensed cabin temperature as being a function of either both the ambient temperature and the vehicle speed or a function of the ambient temperature. This information is preferably stored in a lookup table in the HVAC controller or computer such that when the ambient temperature and vehicle speed are input the corresponding windshield glass temperature is output and used for further calculations, as will be subsequently described.

Once the dew point and windshield glass temperature are established a fog margin can be calculated based upon the following equation:

$$\text{Fog Margin}=\text{Windshield Glass Temperature}-\text{Dew point} \quad (2)$$

The fog margin is used as a control parameter to control the HVAC system, as described further below, and is believed to provide better control over comfort levels within the cabin than is available by relying solely upon the sensed temperature. For example, using the fog margin as a control parameter prevents over-drying of the cabin air due to over-running of the air conditioning.

In a simplified control system it would seem apparent that, based upon the definition of 'dew point', as long as the windshield glass temperature is greater than the dew point no condensation or fog will form on the windshield glass. Conversely, when the windshield glass temperature is less than or equal to the dew point, a fogging condition exists (i.e., condensation or fog will form on the windshield glass). Therefore, it would be possible to control the HVAC system so that an appropriate mode of operation (A/C and/or defrost) is activated when the windshield glass temperature is less than or equal to the dew point. Such a control system may work satisfactorily in some situations, and definitely provides a better result than the HVAC system lacking fog condition calculations.

The inventors, however, have found that the calculation of dew point and windshield glass temperature to anticipate condensation or fogging conditions, which is clearly based upon theoretically valid estimations, does not result in optimum control over, or prevention of, fogging conditions. Further, the inventors have found that the aforementioned calculation does not anticipate the possibility or probability of an impending fogging condition, but rather may only be operable to respond when conditions are suitable for condensation (fog).

Therefore, the use of the comparison of calculated dew point with calculated windshield glass temperature to control the HVAC system is believed to only be operable, at best, to respond to a currently existing fogging condition, and does not prevent the fogging condition from occurring in the first place. Therefore, a control system relying solely upon this comparison will be reactive, rather than proactive, to fogging conditions. Moreover, it has been found by experimentation that the comparison of calculated dew point with calculated windshield glass temperature to control the HVAC system is imperfect, and may not always provide a result indicative of a fogging condition when a fogging condition actually exists. This deficiency is believed to be the result of various environmental variables (e.g., solar load, wind, rain, snow, etc.) and the inherent inaccuracies of the sensors (e.g., humidity, temperature sensors) used in the vehicle.

Thus, through experimentation the inventors found that for a given ambient temperature and glass temperature a difference, referred to as fog predictability, existed between the calculated humidity at which condensation or fog results and the actual humidity at which fog results. The inventors also found that the accuracy of the humidity sensor, referred to as sensor accuracy, contributed to the accuracy of determining the relative humidity within the cabin. Thus, the inventors determined that fog predictability and sensor accuracy result in the improper estimation of the relative humidity, which resulted in an inaccurate calculation of the dew point. To compensate for the fog predictability and the sensor accuracy inaccuracies, the sensed relative humidity is adjusted by a factor referred to as a humidity margin. The humidity margin is calculated using the equation, $$\text{Humidity Margin (\%)} = \text{Fog Predictability (\%)} + \text{Sensor Accuracy (\%)} \quad (3)$$

where the fog predictability and sensor accuracy are constants.

Figure 5:
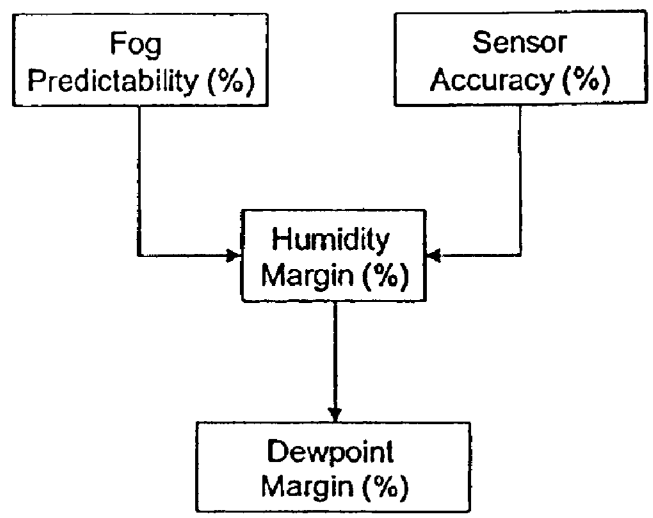
FIG. 5 is a flowchart illustrating a method of determining a dew point margin based upon fog predictability and sensor accuracy.
Figure 6:
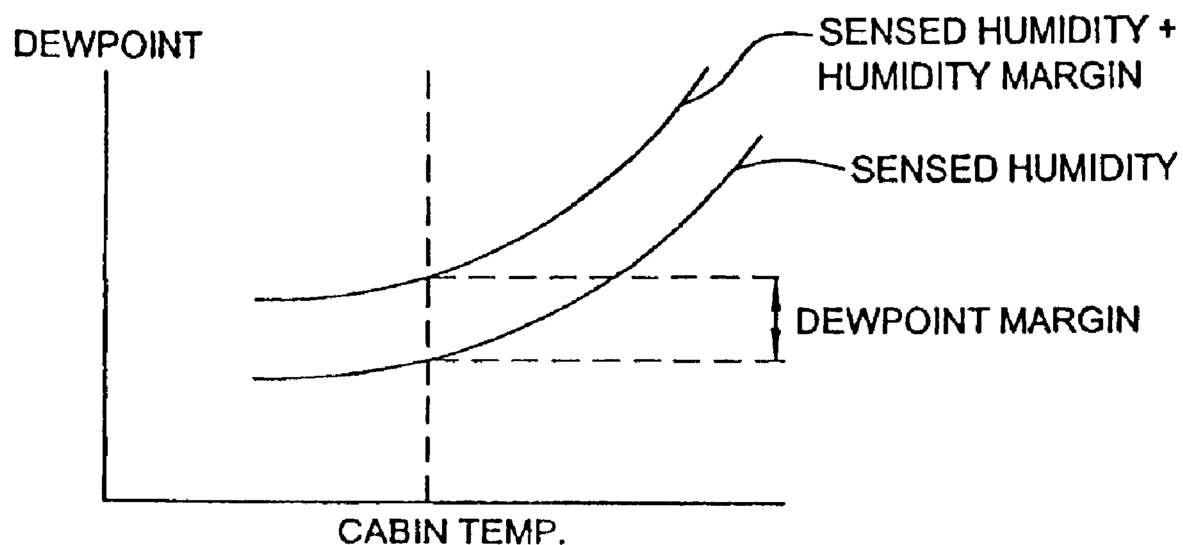
FIG. 6 is a chart illustrating cabin temperature versus dew point and illustrating calculation of dew point margin.

Once the humidity margin is determined a dew point margin can be determined, as shown in FIGS. 5 and 6. Specifically, FIG. 6 shows a graph of cabin temperature v. dew point that illustrates that adjusting the sensed relative humidity by the humidity margin corresponds to a dew point margin. The dew point margin is the amount that the dew point must be raised or lowered to compensate for expected errors in the sensed relative humidity, as explained above. The dew point margin is used as a set point or control parameter to control the HVAC system to prevent fogging and to scale a response to sensed fogging conditions, as will be described further below.

To illustrate the above explanation, through experimentation the inventors found that the fog predictability was 3% and that the sensor accuracy was 5%. Thus, according to equation (3) above the humidity margin is 8%. The humidity margin of 8% correlated to a dew point margin of 2.3° C., which was rounded up to 3° C. Thus, as long as the calculated windshield glass temperature was 3° C. or more than the dew point no fogging conditions developed. It should be noted the fog predictability may need to be experimentally determined for each vehicle model in which the automatic defogging system of the present invention is to be implemented. Further, because the sensor accuracy of the humidity sensor varies between different makes and models, the sensor accuracy will need to be experimentally verified.

Figure 7:
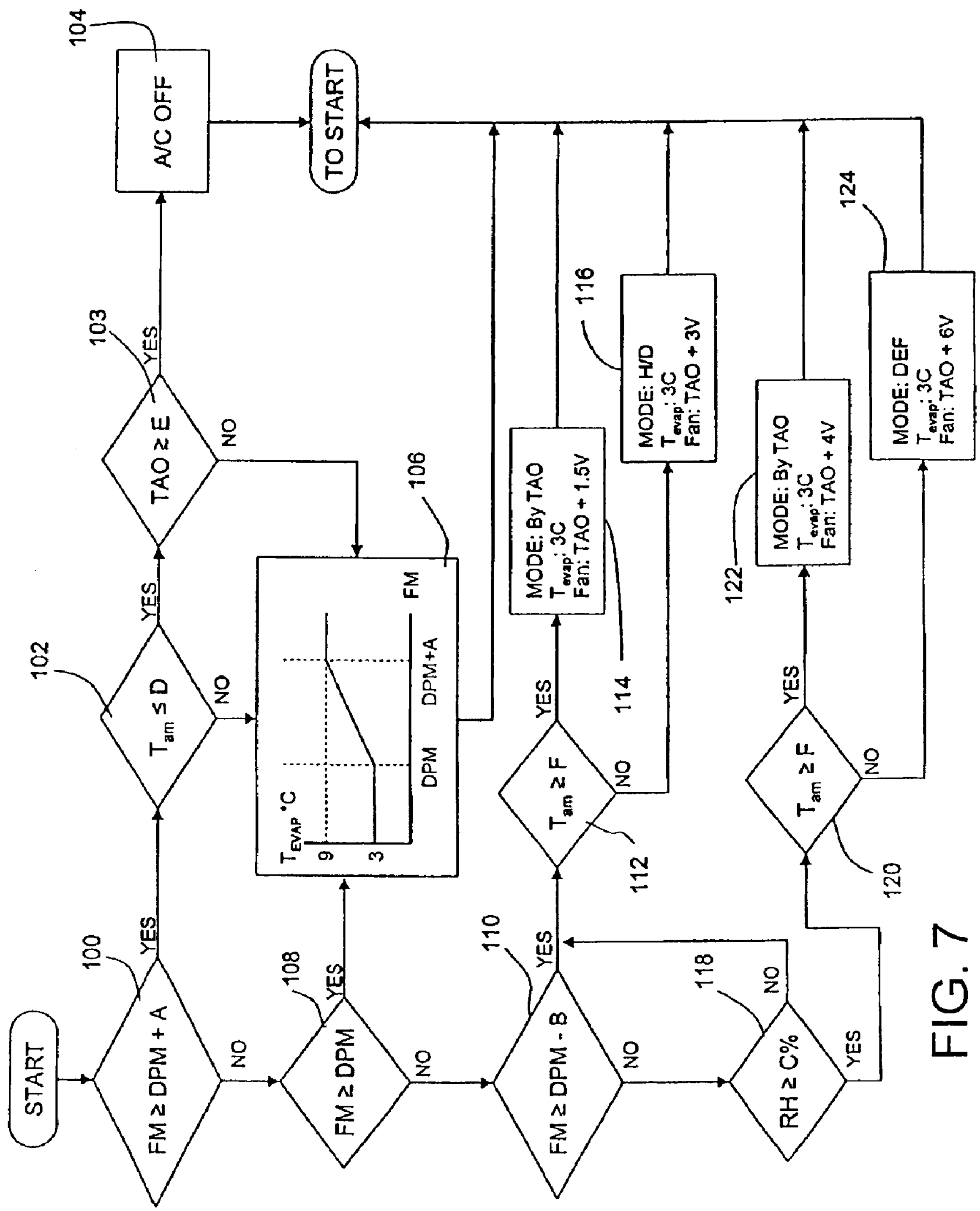
FIG. 7 is a flowchart illustrating the method of vehicle defogging condition control according to the present invention.
Figure 8:
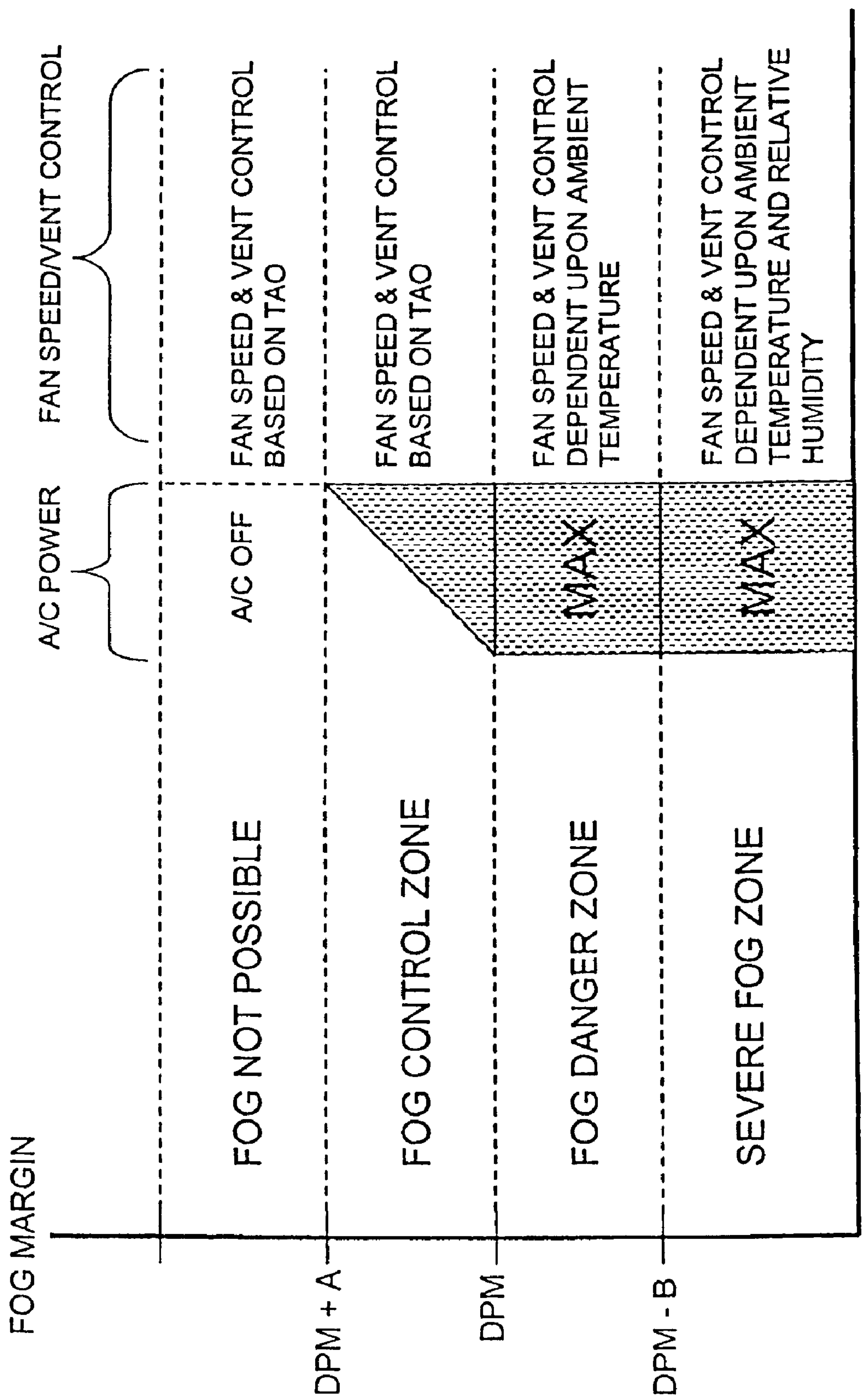
FIG. 8 is a chart illustrating the relationship between fog margin, condensation, HVAC operation, fan speed and vent control.

Referring to FIGS. 7 and 8, the control method of the present invention will now be described. It should be noted that in FIGS. 7 and 8 the dew point margin is referred to as DPM and the fog margin is referred to as FM. Initially, in step 100 it is determined if the fog margin is greater than the dew point margin plus a first predetermined amount A. In other words, if (FM≧DPM+A) then the fog margin is high and there is no risk of fog, see FIG. 8, and the method proceeds to step 102. In step 102 it is determined whether the ambient air temperature ($T_{am}$) is less than or equal to a first predetermined temperature D. If yes, then in step 103, it is determined whether the temperature at the outlet of the HVAC vents (TAO) is greater than a second predetermined temperature E. It should be noted that the calculation of the TAO is well known in the art and may be based upon a number of parameters, such as sensed cabin temperature, solar load, ambient temperature, etc., but is primarily based upon the desired cabin temperature set point input by the user. It is also known in the art that the calculated outlet temperature TAO is commonly used in the automatic mode of operation to control fan speed and vent selection and, as will be seen in the following, this control setting is modified in some portions of the control system to provide for improved response. In the present case, if TAO is greater than the second predetermined temperature E, it is determined that no air conditioning is necessary for defogging purposes, the A/C is turned off (step 104), and the fan speed and vent selection are controlled by the HVAC controller in accordance with the TAO.

If, however, in step 103 if TAO is not greater than the second predetermined temperature E, the air conditioning operation, which is correlated to the evaporator temperature, is modulated between maximum power and minimum power based upon the fog margin according to a predetermined, preferably linear, relationship graphically illustrated (step 106). According to the predetermined relationship, the air conditioning is operated at maximum power (i.e., minimum evaporator temp; $T_{evap}$=3° C.) when the fog margin (FM) is equal to the dew point margin. The air conditioning is operated at a minimum power (i.e., maximum evaporator temp; $T_{evap}$=9° C.) when the fog margin is equal to or greater than the dew point margin plus the first predetermined amount (A); FM≧DMP+A). As illustrated, between FM=DPM and FM=DMP+A the evaporator temperature and, thus, air conditioning operation (power), linearly varies. In any event, in the current situation, since the fog margin is greater than the dew point margin plus the predetermined amount (as determined in step 100), the air conditioning is operated at a minimum power setting (e.g., maximum evaporator temperature; $T_{evap}$=9° C.).

Although not depicted in the graphical illustration of step 106, it is to be understood that in keeping with the full auto mode of operation, the fan speed and vent selection are determined by the HVAC controller in accordance with a predetermined relationship, which is a function of the calculated temperature at the outlet TAO.

Returning to step 102, if it is determined that the ambient temperature ($T_{am}$) is greater than the first predetermined temperature D then, in step 106, the air conditioning is controlled in accordance with the predetermined relationship described above. Accordingly, since the fog margin has previously been determined to be greater than the dew point margin plus the predetermined amount A, the air conditioning is operated at a minimum power setting (evaporator temperature=9° C.). As previously noted, the fan speed and vent selection will be controlled by the HVAC controller in response to or as a function of the TAO.

Returning to step 100, if it is determined that the fog margin is not greater than or equal to the dew point margin plus the predetermined amount (A) then, in step 108, it is determined whether the fog margin is greater than or equal to the dew point margin (FM≧DPM). If the fog margin is greater than or equal to the dew point margin there is some risk of fog developing, see FIG. 8. Thus, action should be taken to prevent the fog or condensation. Therefore, in step 106 the air conditioning is controlled in accordance with the predetermined relationship whereby the air conditioning power/evaporator temperature is correlated to the dew point margin. With reference to the previous description, and keeping in mind that the fog margin has been determined in steps 100 and 108 to be between the dew point margin and the dew point margin plus the predetermined amount (A) (i.e., DPM≦FM<DPM+A), the air conditioning system is operated at the corresponding setting between a maximum power setting (when FM=DPM) and a minimum power setting (when FM=DPM+A). As in the previous steps, fan speed and vent selection are controlled in accordance with the predetermined relationship to calculated temperature at the outlet (TAO).

On the other hand, if it is determined in step 108 that the fog margin is not greater than or equal to the dew point margin (i.e., FM<DPM) then there is an imminent risk of fog or condensation forming, see FIG. 8. More likely, fog or condensation may have already formed on the windshield glass. This situation may occur when the vehicle is first started or when automatic control is initiated after the vehicle has been operated for some time. Therefore, in the following steps the extent or intensity of the response to this fog threat is determined based upon the fog margin and ambient temperature.

In step 110 it is determined whether the fog margin is greater than the dew point margin less a second predetermined amount. If the fog margin is greater than the dew point margin less the second predetermined amount (i.e., DPM>FM>(DPM−B)), then, in step 112, it is determined whether the ambient temperature ($T_{am}$) is greater than a second predetermined ambient temperature (F). In this regard it is noted that the second predetermined ambient temperature is a rather low temperature, and takes into account the fact that the threat of condensation forming increases as the temperature decreases. Therefore, the system response depends upon whether the temperature is above or below the second predetermined ambient temperature (F).

If the ambient temperature is greater than or equal to the second predetermined ambient temperature ($T_{am}$≧F), then the HVAC mode of operation (vent selection) is controlled in accordance with the predetermined relationship to the temperature at the outlet (TAO), while the fan is operated at a slightly increased speed (fan speed determined by TAO+1.5V) and the air conditioning is operated at maximum power ($T_{evap}$=3° C.).

On the other hand, if the ambient temperature is less than the second predetermined ambient temperature ($T_{am}$<F), a more forceful or intense response is in order. Therefore, in step 116, the defrost vents and the floor vents are activated (mode=H/D), the air conditioner is operated at maximum power ($T_{evap}$=3° C.), and the fan is operated at a relatively higher speed (fan speed determined by TAO+3V).

Returning to step 110, if it is determined that the fog margin is not greater than or equal to the dew point margin less the second predetermined amount (i.e., FM<DPM−B), then, in step 118 it is determined whether the relative humidity is greater than or equal to a predetermined relative humidity value (RH≧C %). Accordingly, if the relative humidity is smaller than the predetermined relative humidity value (i.e., RH<C %), the threat of condensation forming is judged to be relatively low even with the low fog margin, and the control passes to step 112 for determination of the appropriate HVAC response, described above.

On the other hand, if the relative humidity is greater than or equal to the predetermined relative humidity value (C) then, in step 120, the ambient temperature ($T_{am}$) is compared to the second predetermined ambient temperature (F), like in step 112. However, since the fog margin is so low, and perhaps negative, a stronger or more intense response is necessary.

Therefore, if it is determined in step 120 that the ambient temperature is greater than or equal to the second predetermined ambient temperature, then, in step 122, the mode of operation is controlled by the temperature at the outlet (TAO), as described above, while the fan is operated at a medium-high speed (speed determined by TAO+4V) and the air conditioning is operated at maximum power ($T_{evap}$=3° C.). On the other hand, if it is determined in step 120 that the ambient temperature is less than the second predetermined ambient temperature, then, in step 124, the defrost vents are activated, the air conditioner is operated at maximum power ($T_{evap}$=3° C.), and the fan is operated at a high speed setting (speed determined by TAO+6V).

Tests using the control logic described above have been conducted by the inventors, and appropriate values for the predetermined amounts or values set forth above have been determined. Namely, the dew point margin was equal to 3, as previously noted, the first predetermined amount A was equal to 8, the second predetermined amount B was equal to 4 (the dew point margin +1), the predetermined relative humidity value C was 11% (with it being noted that this value is preferably equal to or slightly larger than the lower sensitivity limit of the sensor), the first predetermined ambient temperature D was found to be 18° C., the predetermined temperature at the outlet (TAO) E was equal to 12° C., and the second predetermined ambient temperature F was equal to 8° C.

It should be noted that these values will vary from vehicle to vehicle and are not to be construed as limiting in any way. Rather, one skilled in the art will be able to recreate the automatic defog control of the present invention, which includes detecting relative humidity for low humidity levels (i.e. less than 10%), by substituting appropriate values based upon simple experimentation in regard to a vehicle in which the control system is installed.

The present application discloses several related inventions that cooperate to permit a low cost, effective automatic defogging control system to be implemented based upon sensed conditions, calculated values, and predetermined values. For example, the application discloses a method and apparatus to calculate windshield glass temperature based upon the ambient temperature and vehicle speed, a method and apparatus to calculate a dew point margin based upon fog prediction accuracy and sensor accuracy, both of which are predetermined values, a method and apparatus for determining fog margin as a function of sensed in-cabin relative humidity and temperature and calculated windshield glass temperature, a method and apparatus for using fog margin to control HVAC operation and more particularly, for adjusting the intensity of the HVAC response based upon the calculated fog margin, a method for offsetting the fog margin-based response by the calculated dew point margin, and a method and apparatus for detecting the relative humidity under low humidity levels (i.e. less than 10%).

While specific embodiments of the invention have been described and illustrated, it is to be understood that these embodiments are provided by way of example only and that the invention is not to be construed as being limited but only by proper scope of the following claims.

What is claimed is:

1. A method for detecting an absolute humidity inside an automotive vehicle comprising the steps of:

providing an automotive vehicle defining a cabin, the vehicle including an HVAC system, an integrated sensor assembly, and an ambient temperature sensor;

calculating the number of occupants in the vehicle;

multiplying the number of occupants by an absolute humidity factor to obtain a total occupant expelled absolute humidity;

determining an outside absolute humidity, and adding the outside absolute humidity to the total occupant expelled absolute humidity to obtain a total vehicle cabin absolute humidity.

2. The method of claim 1, wherein the absolute humidity factor is experimentally determined and is the absolute humidity expelled by an average person.

3. The method of claim 2, wherein the HVAC system includes a computer and wherein the step of determining the outside absolute humidity comprises the steps of:

measuring an ambient temperature outside the vehicle with the ambient temperature sensor, and determining the corresponding outside absolute humidity from a look up table stored in the HVAC system computer based on the ambient temperature.

4. A method for detecting low levels of humidity inside an automotive vehicle comprising the steps of:

providing an automotive vehicle defining a cabin, the vehicle including an HVAC system, an integrated sensor assembly, and an ambient temperature sensor;

measuring a relative humidity in the vehicle cabin with the integrated sensor;

determining if the relative humidity is less than a predetermined value;

calculating the number of occupants in the vehicle;

multiplying the number of occupants by an absolute humidity factor to obtain a total occupant expelled absolute humidity;

determining an outside absolute humidity, and adding the outside absolute humidity to the total occupant expelled absolute humidity to obtain a total vehicle cabin absolute humidity.

5. The method of claim 4, wherein the predetermined value is 10%.

6. The method of claim 5, wherein the absolute humidity factor is experimentally determined and is the absolute humidity expelled by an average person.

7. The method of claim 6, wherein the HVAC system includes a computer and wherein the step of determining the outside absolute humidity comprises the steps of:

measuring an ambient temperature outside the vehicle with the ambient temperature sensor, and determining the corresponding outside absolute humidity from a look up table stored in the HVAC system computer based on the ambient temperature.

* * * * *